United States Patent [19]

Shimamura et al.

[11] Patent Number: 4,773,301
[45] Date of Patent: Sep. 27, 1988

[54] PRESSURE CONTROL DEVICE FOR USE WITH PNEUMATIC BRAKE BOOSTER

[75] Inventors: Morihiko Shimamura, Higashimatsuyama; Jun Kubo, Hino; Kazuyoshi Fukawa, Yokosuka, all of Japan

[73] Assignee: Nissan Motor Co., Ltd., Japan

[21] Appl. No.: 894,050

[22] Filed: Aug. 7, 1986

[30] Foreign Application Priority Data

Aug. 13, 1985 [JP] Japan .................. 60-177994

[51] Int. Cl.$^4$ ............................................ F15B 13/16
[52] U.S. Cl. ...................... 91/358 R; 91/460; 91/280; 91/453; 91/433; 188/355; 137/627.5; 137/596.17
[58] Field of Search .................. 91/460, 280, 358 A, 91/358 R, 368, 453, 361, 433, 459; 60/547.1; 303/5; 188/355; 251/30.01; 137/596.17, 627.5

[56] References Cited

U.S. PATENT DOCUMENTS

| | | | |
|---|---|---|---|
| 2,977,934 | 4/1961 | Fulkownik | 91/460 |
| 2,989,852 | 6/1961 | Rockwell | 91/460 |
| 3,027,878 | 4/1965 | Keyt et al. | 91/453 |
| 3,216,454 | 7/1965 | Richter et al. | 91/453 |
| 3,921,502 | 11/1975 | Lauer et al. | 91/460 |
| 4,005,640 | 2/1977 | Thomas | 91/460 |
| 4,078,385 | 3/1978 | Zabadneh | 91/460 |
| 4,123,908 | 11/1978 | Bertone | 91/460 |
| 4,344,287 | 10/1982 | Sindelar | 91/460 |
| 4,474,004 | 10/1984 | Thomas | 91/460 |

FOREIGN PATENT DOCUMENTS

| | | | |
|---|---|---|---|
| 0132668 | 11/1978 | Japan | 91/460 |
| 58-188746 | 11/1983 | Japan . | |
| 1011920 | 4/1983 | U.S.S.R. | 91/358 R |
| 2060099 | 4/1981 | United Kingdom | 91/460 |
| 2099526 | 11/1982 | United Kingdom | 91/460 |

Primary Examiner—Robert E. Garrett
Assistant Examiner—Thomas Denion
Attorney, Agent, or Firm—Leydig, Voit & Mayer

[57] ABSTRACT

An electromagnetically operated mechanism produces an unstable first controlled pressure which, under a given condition, is saturated quickly to a degree slightly lower than a target value determined in accordance with an information signal issued from a brake pedal force detecting device. A servo-motor type actuator produces a stable second controlled pressure which, under a given condition, is saturated slowly to the target value. A control mechanism applies only the first controlled pressure to a work chamber of a pneumatic brake booster when the first controlled pressure is higher than the second controlled pressure, and applies only the second controlled pressure to the work chamber after the second controlled pressure becomes higher than the first controlled pressure.

10 Claims, 2 Drawing Sheets

PRESSURE CONTROL DEVICE FOR USE WITH PNEUMATIC BRAKE BOOSTER

BACKGROUND OF THE INVENTION

1. Field of the Invention

The present invention relates in general to a pneumatic power brake system which permits the driver to easily brake vehicle by exerting only a little pressure on the brake pedal, and more particularly to a pressure control device of the pneumatic power brake system, by which the pressure applied to the work chamber of a brake booster is suitably controlled in accordance with a brake pedal force applied to an input means of the booster from the brake pedal by the driver.

2. Description of a Prior Art

Japanese Patent First Provisional Publication No. 58-188746 shows a pneumatic brake booster equipped with an electronic pressure control means by which the multiplied pressure produced by the booster is electronically controlled in accordance with a brake pedal force applied to an input means of the booster from the brake pedal by the driver. Since the output characteristic of the brake booster can be easily changed by adjusting only the pressure control means, the brake boosters of this type are widely applicable to various brake systems. That is, if desired, it is possible to adjust the output characteristic of the brake booster according to the preference of the driver. Furthermore, when information regarding vehicle weight and vehicle deceleration and the like are electronically communicated to the pressure control means, it becomes possible to obtain ideal brake pressure which is adjustable in accordance with the operational condition of the vehicle.

However, the above-mentioned conventional brake system is somewhat slowly in producing stable multiplied brake pressure due to the inherent construction of the pressure control means.

SUMMARY OF THE INVENTION

It is, therefore, an object of the present invention to provide a pneumatic power brake system with an improved pressure control means by which a stable multiplied brake pressure is quickly produced by a brake booster in accordance with a brake pedal force applied to the input means of the booster by the driver.

According to the present invention, there is provided, for a pneumatic brake booster, a pressure control means which comprises an electromagnetically controlled valve means for assuring quick production of the multiplied brake pressure by the brake booster in response to depression of the brake pedal, and a servomotor type control means for assuring stable production of the multiplied brake pressure by the brake booster.

According to the present invention, there is provided a pressure control device for use with a pneumatic brake booster equipped with a brake pedal force detecting device by which a brake pedal force applied thereto is detected, the pressure control device comprising first means for producing a first controlled pressure which, under a given condition, is increased to a first value slightly lower than a target value determined in accordance with the brake pedal force, the first controlled pressure being unstable when increased to the first value and applied to a work chamber of the brake booster; second means for producing a second controlled pressure which, under a given condition, is increased to the target value, the second controlled pressure being stable when increased to the target value and applied to the work chamber of the brake booster; and third means for applying only the first controlled pressure to the work chamber when the first controlled pressure is higher than the second controlled pressure, and applying only the second controlled pressure to the work chamber when the second controlled pressure is higher than the first controlled pressure.

DETAILED DESCRIPTION OF THE INVENTION

Figure 1:
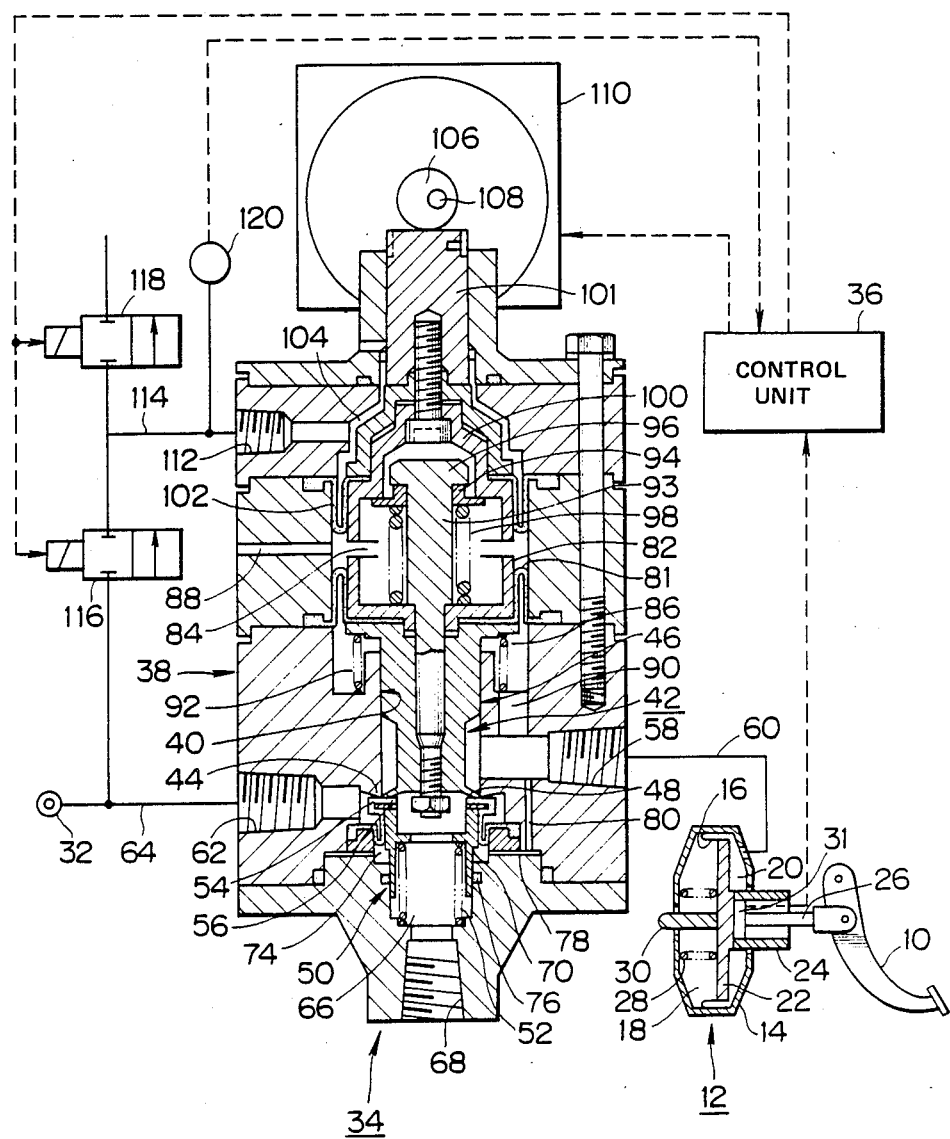
FIG. 1 is a schematic view of a pneumatic power brake system according to the present invention, showing on a large scale an axial section of a pressure control valve employed in the system.

Referring to FIG. 1 of the drawings, there is shown a brake system according to the present invention.

In the drawing, is a brake pedal denoted by numeral 10, is pivotally mounted on a vehicle body (not shown), and is denoted by numeral 12, a pneumatic brake booster by which multiplied brake pressure is produced in response to operation of the brake pedal 10. The brake booster 12 comprises generally a housing 14, a diaphragm 16 dividing the interior of the housing 14 into first and second (or work) chambers 18 and 20, and a power piston 22 attached to the diaphragm 16 to move therewith.

A cylindrical body 24 is coaxially connected to the power piston 22 and projected outwardly from the housing 14. The body 24 is linked to the brake pedal 10 through an input rod 26 pivotally connected to the body 24. A return spring 28 is disposed in the first chamber 18 to bias the power piston 22 toward the rest position of the piston. An output rod 30 is connected to the power piston 22 and projected outwardly from the housing 14, as shown. Although not shown in the drawing, the output rod 30 is connected to a piston of a brake master cylinder. A brake pedal force detecting device 31, such as a device disclosed in Japanese patent application No. 60-177991 filed on Aug. 13, 1985 (which has a corresponding U.S. patent application Ser. No. 894,040, filed Aug. 7, 1986 is mounted in the brake booster 12 to detect a force practically applied to the input rod 26 of the booster 12 from the brake pedal 10.

The first chamber 18 of the housing 14 is constantly communicated with the atmosphere through an opening formed in the housing 14, while, the second chamber 20 is selectively communicated with a pressurized air source 32 and the atmosphere through a pressure control valve 34 which is controlled by a control unit 36 which comprises a microcomputer. Receiving information signals from the brake pedal force detecting device 31 and an after-mentioned pressure sensor 120, the control unit 36 operates the valve 34 in such a manner that when no pressure is exerted on the brake pedal 10, the second chamber 20 of the brake booster 12 is communicated with the atmosphere, and when some pressure is applied to the brake pedal 10, the second chamber 20 is applied with a corresponding degree of pressurized air from the air source 32.

In the following, the terms "upper", "lower", "right", "left", "upward", "downward" and the like should be taken to mean "upper", "lower" ... and "downward", as viewed in FIG. 1.

The pressure control valve 34 comprises a cylindrical housing 38 which generally include coaxially arranged five parts (no numerals), as shown. The housing 38 has an axially extending stepped bore 40 formed therethrough, in which a valve mechanism 42 is installed in a manner as will be described hereinafter.

The valve mechanism 42 comprises a first valve seat 44 formed on an annular step defined in a lower portion of the bore 40. For defining the step, the bore 40 has a first enlarged portion (no numeral) below the step, as shown. A plunger 46 is slidably received in a generally middle portion of the bore 40, and has at its lower end a second valve seat 48. In the illustrated condition, the second valve seat 48 is concentrically arranged within the first valve seat 44 with an annular space (no numeral) defined therebetween.

A tubular valve body 50 is axially slidably received in the bore 40 at a position below the first valve seat 44. A coil spring 52 is compressed between the valve body 50 and a stepped portion of the bore 40 to bias the valve body 50 upward. With the force of the spring 52, an upper annular flat portion of the valve body 50 is biased to sealingly abut on both the first and second valve seats 44 and 48. The upper annular flat portion of the valve body 50 comprises a first sealing portion 54 which is sealingly contactable with the first valve seat 44, and a second sealing portion 56 which is sealingly contactable with the second valve seat 48.

A first port 58 is formed in the right portion of the housing 38, which leads to an annular groove (no numeral) formed about the plunger 46 above the second valve seat 48. The first port 58 in communication with the second chamber 20 of the brake booster 12 through a tube 60.

A second port 62 is formed in the left portion of the housing 38, which leads to the afore-mentioned first enlarged portion of the bore 40 defined below the first valve seat 44. The second port 62 communicates with a pressurized air source 32 through a tube 64. A third port 68 is formed in the lower portion of the housing 38, which leads to the interior 66 of the tubular valve body 50, and thus to the first enlarged portion of the bore 40. The third port 68 is exposed to the atmosphere.

The tubular valve body 50 has a smaller diameter lower portion defining a stepped portion 70 thereon. A diaphragm member 72 extends between the valve body 50 and the wall of the bore 40 to define a pressure chamber 74 to which said stepped portion 70 is exposed. An annular seal ring 76 is arranged to effect sealing between the tubular valve body 50 and the wall of the bore 40 thereby to isolate the pressure chamber 74 from the surrounding.

The pressure chamber 74 communicates with the first port 58 through two passages 78 and 80 formed in the housing 38. It is to be noted that the pressure receiving area of the stepped portion 70 of the valve body 50 is equal to that of the aforementioned annular space defined between the first and second valves seats 44 and 48. Thus, when equal pressure is applied to them, the positioning of the valve body 50 is balanced.

The plunger 46 is provided at its generally middle portion with a second piston 82. A diaphragm member 81 extends between the second piston 82 and the wall of a second enlarged portion of the bore 40 to define thereabove an atmospheric chamber 84 and therebelow a second pressure chamber 86. The atmospheric chamber 84 is in communication with the atmosphere through a passage 88 formed in the housing 88. While, the second pressure chamber 86 is in communication with the afore-mentioned first port 58 through a passage 90 formed in the housing 38.

A coil spring 92 is disposed in the second pressure chamber 86 and compressed between a flange portion of the plunger 46 and a recessed portion of the second enlarged portion of the bore 40 to bias the plunger 46 and thus the second piston 82 upwardly. Under a condition wherein the plunger 46 assumes its uppermost position, the second valve seat 48 of the plunger 46 is separated from the valve body 50 while the upper flat portion of the valve body 50 is in sealing contact with the first valve seat 44. Thus, under this condition, the second chamber 20 of the brake booster 12 communicates with the atmosphere through the tube 60, the first port 58, a clearance between the second valve seat 48 and the valve body 50, the interior 66 of the valve body 50 and the third port 68.

The plunger 46 has a coaxially extending rod 93 bolted thereto. The upper portion of the rod 93 is placed in the atmospheric chamber 84 defined above the second piston 82. An annular spring seat 94 is axially slidably disposed on the rod 93. The upper portion of the rod 93 is formed with an enlarged head 96 by which disengagement of the spring seat 94 from the rod 93 is prevented. A coil spring 98 is compressed between the second piston 82 and the annular spring seat 94 to press the spring seat 94 against the head 96.

As shown in FIG. 1, a first piston 100 is seated at its inner stepped portion on the annular spring seat 94. If desired, the first piston 100 may be secured to the spring seat 94 to move therewith. A diaphragm member 102 extends between the first piston 100 and the wall of the second enlarged portion of the bore 40 to define thereabove a first pressure chamber 104 and therebelow the afore-mentioned atmospheric chamber 84. The first piston 100 has an upper member 101 bolted thereto, which projects to the outside of the housing 38, as shown.

Slidably engaged with the top of the upper member 101 is an eccentric cam 106 which is secured to a drive shaft 108 of a servo-motor 110. The operation of the servo-motor 110 is controlled by the afore-mentioned control unit 36. When, due to energization of the servo-motor, the cam 106 rotates by a given angle, the first piston 100 is pushed downward compressing the coil spring 98 thereby varying or increasing the biasing force applied to the plunger 46.

The first pressure chamber 104 is communicated with the pressurized air source 32 through a fourth port 112, a tube 114 and a first electromagnetic valve 116. The tube 114 has a branch which leads to the atmosphere through a second electromagnetic valve 118. The first and second electromagnetic valves 116 and 118 are controlled by the control unit 36. A pressure sensor 120 is connected to the tube 114 to detect a pressure in the tube 114 that is, in the first pressure chamber 104. Information signals issued from the sensor 120 are fed to the control unit 36.

Now, operation of the pressure control device of the present invention will be described For ease of explanation, it will begin with the booster 12 in a rest condition wherein no brake pedal force is applied thereto by the brake pedal 10.

Absence of brake pedal force to the input rod 26 of the brake booster 12 is sensed by the input pressure detecting device 31 mounted in the brake booster 12. Upon sensing this, the control unit 36 causes the servo-motor 110 to assume its rest position and at the same time, causes the first and second electromagnetic valves 116 and 118 to assume the closed and open positions respectively. With this, the first pressure chamber 104 of the pressure control valve 34 communicates with the atmosphere. Under this condition, the plunger 46 assumes its uppermost position and thus, as has been described hereinafore, the second chamber 20 of the brake booster 12 is communicated with the atmosphere through the tube 60, the first port 58, the clearance between the second valve seat 48 and the valve body 50, the interior, 66 of the valve body 50 and the third port 68. Thus no pressure difference is produced between the first and second chambers 18 and 20 of the brake booster 12, and, the power piston 22 assumes its rightmost rest position due to the biasing force of the return spring 28.

When, upon depression of the brake pedal 10, a certain brake force is applied to the input rod 26 of the brake booster 12, the intensity of the force is detected by the pressure sensor 31. Upon this occurence, the control unit 36 produces a controlled pressure in chamber 20, in accordance with the intensity of the brake pedal force sensed by the brake pedal force detecting device 31, via two means. The first means includes closing the second electromagnetic valve 118 and the same time opening the first electromagnetic valve 116 thereby supplying the first pressure chamber 104 of the pressure control valve 34 with pressurized air from the air source 32. Simultaneously the, control unit 36 produces a controlled pressure in chamber 20 via a second means, controlling servo-motor 110, to allow the cam 106 to assume a corresponding angular position.

Since the first and second electromagnetic valves 116 and 118 of the first means make quicker response than the servo-motor 110 of the second means to instruction signals, the pressure applied to the first pressure chamber 104 quickly moves the first piston 100 and thus the spring seat 94 downward, compressing the coil spring 98. With this, the plunger 46 is quickly moved downward to such a position as to press the second valve seat 48 on the upper flat portion of the tubular valve body 50 blocking the communication between the second chamber 20 of the brake booster 12 and the atmosphere. The pressure application to the first pressure chamber 104 further moves the plunger 46 and the tubular valve body 50 downward against the force of the spring 52, and thus separates the upper flat portion of the valve body 50 from the first valve seat 44. With this, the pressurized air from the air source 32 is supplied to the second chamber 20 of the brake booster 12 through the tube 64, the second port 62, a clearance between the first valve seat 44 and the valve body 50, the first port 58 and the tube 60. Thus, the power piston 22 of the brake booster 12 is moved leftward against the force of the return spring 28.

Figure 2:
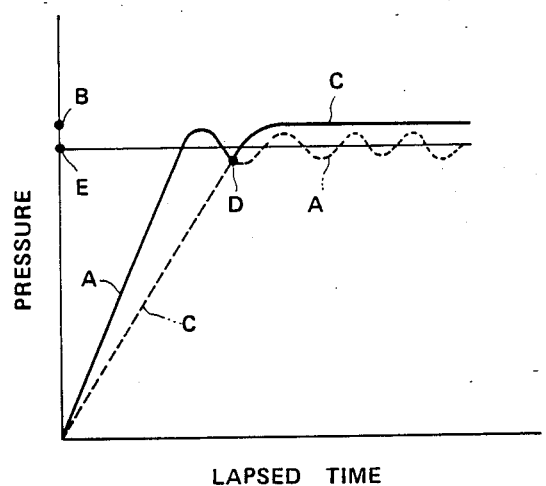
FIG. 2 is a graph showing the characteristic pressure curve obtained by the present invention.

The intensity of the pressure applied to the first pressure chamber 104 of the pressure control valve 34 is detected by the pressure sensor 120. When the pressure in the chamber 104 increases to a value "E" (see FIG. 2), smaller by a given degree than a target value "B", determined by the information signal from the brake pedal force detecting device 31 in the brake booster 12, the control unit 36 closes the first electromagnetic valve 116.

However, due to the nature of the electromagnetic valve 116, the pressure in the first pressure chamber 104 increases somewhat after application of a signal to the valve 116 to close the same. This increased pressure is detected by the pressure sensor 120. Upon receiving the information signal from the sensor 120, the control unit 36 opens the second electromagnetic valve 118 in order to reduce the pressure to the valve "E". Upon sensing the value "E" of the pressure in the first pressure chamber 104, the pressure sensor 120 issues a corresponding signal causing the control unit 36 to close the second electromangetic valve 118. Due to the nature of the electromagnetic valve 118, the pressure in the first pressure chamber 104 decreases somewhat after application of a signal to the valve 118 to close the same. As a result, as is shown by the broken line section of the curve line "A" in FIG. 2, the second chamber 20 of the brake booster 12 tends to be applied with an unstable first controlled pressure which pulses in response to the open and close operations of the first and second electromagnetic valves 116 and 118. The average intensity of the first controlled pressure produced by the first means thus becomes smaller by a given degree than the target value "B" which is determined by the information signal from the brake pedal force detecting device 31.

During the pneumatic operation as described hereinabove, the servo-motor 110 tends to move the first piston 100 downward by means of the cam 106. However, at the initial stage, the downward movement of the first piston 100 is carried out solely by the pressure applied to the first pressure chamber 104 due to the closing and opening of electromagnetic valves 118 and 116, respectively, of the first means because the pressure application to the chamber 104 is made quicker than rotation of the cam 106. Thus, during an initial stage, rotation of the cam 106 does not contribute to the downward movement of the first piston 100. This is shown by the broken line section of the curve C in FIG. 2. Later, at the time denoted by "D" in the graph, the downward movement of the first piston 100 is carried out by the cam 106 of servo-motor 110 of the second means of the pressure in the first pressure chamber 104 of the first means. This is because the downward displacement or the first piston 100 will be the greater of that determined by rotation of the cam 106 or the pressure in the first pressure chamber 104, and by the pressure in the first pressure chamber 104 is made smaller by a degree than that given corresponding to the information signal from the brake pedal force detecting device 31.

The downward displacement of the first piston 100 effected by the cam 106, and thus the force of the spring 98 for biasing the plunger 46 downward are kept constant so long as the brake pedal force applied to the input rod 26 of the brake booster 12 is constant.

During the operation as mentioned above, the second pressure chamber 86 is supplied with pressure equal to the pressure in the second chamber 20, so that the second piston 82 and thus the plunger 46 are lifted against the biasing force of the spring 98. This upward movement of the plunger 46 brings about a contact of the valve body 50 with the first valve seat 44 and a separation of the second valve seat 48 from the valve body 50, so that the pressurized air in the second chamber 20 of the brake booster 12 is discharged to the open air through the third port 68. When the pressure in the second chamber 20 is reduced to a certain value, the second piston 82 and thus the plunger 46 are moved down to again supply the second chamber 20 with pressurized air.

As a result, the pressure in the second chamber 20 (viz., the pressure in the second chamber 20, the tube 60, the first port 58 and the passage 90) is controlled at a value corresponding to the biasing force of the coil spring 98 determined by the downward displacement of the first piston 100 effected by the cam 106 of the servo-motor 110. That is, the pressure in the second chamber 20 of the brake booster 12 is controlled at a stable second controlled pressure in accordance with a brake pedal force applied to the input rod 26 of the brake booster 12 by the brake pedal 10. This will be understood from the horizontal solid section of the line "C" of the graph of FIG. 2. Thus, the output rod 30 of the brake booster 12 is moved leftward together with the power piston 22 with a force multiplied in accordance with the brake pedal force, so that the piston of the associated brake master cylinder is actuated for effecting a braking of the vehicle.

The following modifications are employable in the invention.

A first modification is that, in place of the cam 106, a rack and pinion unit may be used for moving the first piston 100 in response to the operation of the servo-motor 110. In this case, the pinion is secured to the drive shaft 108 of the servo-motor 110 and the rack is secured to the first piston 100. A second modification is that a stepping motor may be used in place of the servo-motor.

What is claimed is:

1. A pressure control device for use with a pneumatic brake booster equipped with a brake pedal force detecting device by which a brake pedal force applied thereto is detected, said pressure control device comprising:

first means for producing a first controlled pressure which, under a given condition, is changed to a first value slightly lower than a target value determined in accordance with a brake pedal force, the first controlled pressure being unstable once changed to the first value, the first controlled pressure being applied to a work chamber of a brake booster;

second means for producing a second controlled pressure which, under the given condition, is changed to the target value, the second controlled pressure being stable once changed to the target value and being applied to the work chamber of the brake booster; and third means for applying only the first controlled pressure to the work chamber when the first controlled pressure is higher than the second controlled pressure, and applying only the second controlled pressure to the work chamber when the second controlled pressure is higher that the first controlled pressure.

2. A pressure control device as claimed in claim 1, in which said first means comprises first and second electromagnetic valves selective open and close operations of which cause pulsation of said first controlled pressure once changed to the first value, and in which said second means comprises a servo-motor the operation of which brings about a stable condition of said second controlled pressure once increased to the target value.

3. A pressure control device as claimed in claim 2, in which said third means comprises:

a valve mechanism having first, second and third conditions, said first condition being a condition wherein said work chamber of said brake booster is blocked from a pressurized air source as well as the atmophere, said second condition being a condition wherein said work chamber is communicated with the pressurized air source but blocked from the atmosphere, and said third condition being a condition wherein said work chamber is communicated with the atmosphere but blocked from the pressurized air source;

a pressure chamber to which said first and second electromagnetic valves are connected and with which said valve mechanism is incorporated in such a manner that when a certain pressure is applied to said pressure chamber through said first and second electromagnetic valves, said valve mechanism assumes said second and third conditions selectively in response to the open and close operations of said first and second electromagnetic valves to apply said first controlled pressure to said work chamber; and an actuator means which forcibly moves said valve mechanism to assume said second condition when said servo-motor is operated to assume a given condition.

4. A pressure control device for use with a pneumatic brake booster equipped with a brake pedal force detecting device by which a brake pedal force applied thereto is detected, said pressure control device comprising:

a housing having a stepped bore formed therein;

a valve mechanism slidably disposed in said stepped bore of said housing, said valve mechanism having first, second and third conditions, said first condition being a condition wherein a work chamber of said brake booster is blocked from a pressurized air source as well as the atmosphere, said second condition being a condition wherein said work chamber is communicated with pressurized air source but blocked from the atmosphere and said third condition being a condition wherein said work chamber is communicated with the atmosphere but blocked from the pressurized air source;

a pressure chamber formed in said housing and incorporated with said valve mechanism in such a manner that when a certain pressure is applied to said pressure chamber, said valve mechanism is caused to assume said second condition;

first and second electromagnetic valves which are connected to said pressure chamber, said pressure chamber being connected to the pressurized air source through said first electromagnetic valve and communicated with the atmosphere through said second electromagnetic valve;

compensating means for causing said valve mechanism to assume said third condition when the pressure applied to said pressure chamber exceeds a predetermined degree; and an actuator for forcibly moving said valve mechanism to assume only said second condition when a given time is lapsed after an increase of the pressure applied to said pressure chamber.

5. A pressure control device as claimed in claim 4, in which said compensating means comprises:

another pressure chamber formed in said housing, said another pressure chamber being so constructed as to move said valve mechanism to assume said second condition when a pressure above said predetermined degree applied to said another chamber;

a pressure sensor for detecting the intensity of the pressure applied to said pressure chamber; and a control unit for electronically controlling said first and second electromagnetic valves and said actuator in accordance with information signals issued from said pressure sensor and said brake pedal force detecting device.

6. A pressure control device as claimed in claim 5, in which said control unit is so designed as to close said first electromagnetic valve and open said second electromagnetic valve when the pressure applied to said pressure chamber is increased to a degree slightly smaller than that determined in accordance with the information signal issued from said brake pedal force detecting device.

7. A pressure control device as claimed in claim 6, in which said valve mechanism comprises:

a plunger axially slidably received in said stepped bore of said housing, said plunger incorporating a valve means by which said first, second and third conditions are provided;

first and second pistons which are axially movably disposed in an enlarged section of said stepped bore with said second piston connected to said plunger, said first piston having an extension to which said actuator is operatively engaged;

a coil spring compressed between said first and second pistons;

a first diaphragm member extending between said first piston and the wall of said enlarged section of the stepped bore to define thereabove said pressure chamber;

a second diaphragm member extending between said second piston and the wall of said enlarged section of said stepped bore to define therebelow said another pressure chamber, and between said first and second pistons an atmospheric chamber which is communicated with the atmosphere; and biasing means for biasing said second piston toward said first piston.

8. A pressure control device as claimed in claim 7, in which said valve means of said plunger comprises:

a first annular valve seat formed on a stepped portion of said stepped bore of the housing;

a second annular valve seat formed on an end of said plunger, said second valve seat being arranged concentric with respect said first valve seat with an annular space defined therebetween;

a tubular valve body axially slidably received in said stepped bore with its annular flat portion sealingly contactable with both said first and second annular seats; and a coil spring biasing said tubular valve body to sealingly contact with said first and second annular valve seats.

9. A pressure control device as claimed in claim 8, further comprising a diaphragm member which extends between said tubular valve body and the wall of said stepped bore to block communication between the pressurized air source and the atmosphere when said valve mechanism assumes said second condition.

10. A pressure control device as claimed in claim 9, in which said housing has first, second and third ports, said first port leading to an annular recess formed about said plunger at a position above said second valve seat, said second port being communicated with the interior of said tubular valve body and said third portion being communicated with an enlarged section of the stepped bore in which section said annular flat portion of said tubular valve body is placed.

* * * * *